(12) United States Patent
Monroe et al.

(10) Patent No.: US 8,328,359 B2
(45) Date of Patent: Dec. 11, 2012

(54) CAMERA STABILIZER

(75) Inventors: Douglas Jerome Monroe, Pleasant View, UT (US); Roland Leland Pearson, Salt Lake City, UT (US)

(73) Assignee: Gavry & Monroe Productions, LLC, Pleasant View, UT (US)

( * ) Notice: Subject to any disclaimer, the term of this patent is extended or adjusted under 35 U.S.C. 154(b) by 143 days.

(21) Appl. No.: 13/038,130

(22) Filed: Mar. 1, 2011

(65) Prior Publication Data

US 2011/0211164 A1 Sep. 1, 2011

Related U.S. Application Data

(60) Provisional application No. 61/339,295, filed on Mar. 1, 2010.

(51) Int. Cl.
*G03B 17/00* (2006.01)

(52) U.S. Cl. .......................... 352/243; 348/376; 396/423

(58) Field of Classification Search .................. 352/243, 352/244; 348/373, 376; 396/420, 423
See application file for complete search history.

(56) References Cited

U.S. PATENT DOCUMENTS

| | | | | |
|---|---|---|---|---|
| 3,767,095 A | * | 10/1973 | Jones | 224/261 |
| 3,966,101 A | * | 6/1976 | Taylor, III | 224/219 |
| 4,692,807 A | | 9/1987 | Kee | |
| 5,064,109 A | * | 11/1991 | Caster | 224/267 |
| 5,111,983 A | * | 5/1992 | Simmons et al. | 224/258 |
| 5,435,515 A | * | 7/1995 | DiGiulio et al. | 248/576 |
| 6,641,010 B2 | * | 11/2003 | Greene | 224/265 |
| 6,773,110 B1 | | 8/2004 | Gale | |
| 7,191,923 B1 | * | 3/2007 | Kundig | 224/257 |
| 7,691,075 B1 | * | 4/2010 | Reece | 602/20 |
| 2002/0134896 A1 | * | 9/2002 | Hunter | 248/118 |
| 2004/0262342 A1 | | 12/2004 | Pringle | |

* cited by examiner

*Primary Examiner* — William C Dowling
(74) *Attorney, Agent, or Firm* — Maschoff Gilmore & Israelsen (57) ABSTRACT

A camera stabilizer includes a grip for cameras that provides for stability of the camera without a shoulder mount or shoulder mount harness. The current camera stabilizer attaches around the arm of the user then extends through a member roughly parallel to the forearm to a grip that is held by the user. The grip is attached to the member by a ball joint that allows free positioning of the grip relative to the member but may then be locked in position for use. The camera is then attached to the grip. This allows the user to stabilize the camera by holding the elbow closer to the torso, by resting the elbow on a steady object, or by simply flexing the wrist which applies tension to the member thereby providing a more stable grip on the camera and a resulting more stable picture. A kit is also disclosed that includes the camera stabilizer and a harness for tethering the camera stabilizer to a camera operator.

20 Claims, 10 Drawing Sheets

CAMERA STABILIZER

CROSS-REFERENCE TO RELATED APPLICATIONS

This application claims the benefit of and priority to U.S. Provisional Patent Application 61/339,295 filed Mar. 1, 2010, the contents of which are hereby incorporated herein by reference.

BACKGROUND OF THE INVENTION

1. The Field of the Invention

The present invention relates to a stabilizing support for cameras. More particularly the invention relates to an ergonomic and portable stabilizing support device designed to reduce camera operator arm fatigue and unwanted shaking from hand held motion picture camera recordings and handheld still photography.

2. The Relevant Technology

Over the past twenty five years new technology has allowed video cameras to evolve from bulky shoulder-supported cameras to the light-weight and compact single-unit multi-purpose camera and recorder of today. The size of these dual-use camera/recorders has quite simply revolutionized the acquisition of motion pictures. For example, in a modern standard-looking 35 millimeter camera form factor an operator can capture high-definition digital video as well as the high quality digital still photography using replaceable lenses.

As these motion picture cameras become smaller and smaller in size and weight, these cameras have also become more maneuverable. This increase in maneuverability enables image capture from different angles and positions than that which would have been available using a conventional shoulder supported video camera. In fact, using the video camera of twenty years ago, the operator of the camera was extremely limited to a small selection of angles and positions that were available with the cumbersome arrangement of the shoulder-supported camera.

However, due to their small size such hand-held cameras of today have an inherent problem of producing a poor quality recording and picture as a result of the unstable hand movement of the operator as opposed to the more stable shoulder-supported cameras of the past. In fact, many veteran camera operators would agree that it is virtually impossible for even the most skilled camera operator to obtain high-quality motion picture recordings with a modern off the shoulder hand-held camera. In addition, the tendency to move the wrist, hand and arm when manipulating the controls and focusing the small hand-held camera results in further unwanted movement in the recording.

While tripods can eliminate this problem for off the shoulder hand-held cameras, tripods generally defeat many of the primary advantages of the portable hand-held camera by reducing its portability. And, in scenarios where the camera operator is in motion, tripods generally do not lend much stabilization assistance whatsoever. Therefore, even though use of a tripod has advantages in certain situations, tripods are not used when the camera is hand held.

Even the stabilizing chips that are present in many camcorders today do not entirely eliminate the jittery movements that cause poor quality image capture recording. And, such stabilizing chips do nothing to lower, or prevent, arm fatigue as the duration of continuous recordation continues.

Many of the same problems are inherent in still photography as well. This is especially the case in lower light situations where longer exposure times are necessary. Handheld still photography encounters similar problems at high zoom factors where small hand movements are magnified and often result in blurred photographs.

Prior attempts have been made to eliminate the shaky and unwanted motion typical in image capture through various stabilization mechanisms. Those previous attempts have been bulky, inadequate, or have interfered with camera functionality and the portability advantages realized with smaller handheld devices. Most of these prior attempts also rely on resting a support on the operator's shoulder, which negates the advantages of the small portable camera as discussed above. Shoulder mount camera support systems also limit the shots available, since the operator's whole body becomes the platform and the intended platform is limited to the shoulder of the user.

Therefore, what would be advantageous is a portable camera-stabilizing device that is comfortable, easily maneuverable for use in many different recording positions, provides access to camera controls, and effectively reduces, or eliminates, unwanted movement in motion picture capture and still photography. Moreover, what would also be advantageous is a camera stabilizer that ergonomically mimics the natural movement of the arm and wrist of the operator without inhibiting the angles, positions, and movement of the camera that the photographer or videographer would prefer to use if-not for fatigue and shaky movement that results thereby.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates to a camera stabilizer for stabilizing a motion image capture or still camera while recording motion pictures or still photos. The camera stabilizer can include a camera mount having a first side and a second side, the first side including means for attaching the camera mount to the camera. The camera stabilizer can include a grip connected to the second side of the camera mount, the grip being sized and shaped to be held in the palm of a human hand. The camera stabilizer can include a joint attached to the grip. The camera stabilizer can include an arm piece connected with the joint, the arm piece extending substantially the length of the human forearm. The arm piece can include a distal end connected to the joint so as to be pivotally connected to the grip and a proximal end. The camera stabilizer can include a forearm brace located at the proximal end of the arm piece, the forearm brace configured to at least partially encircle a human forearm proximate to the human's elbow.

The present invention further relates to a kit including the camera stabilizer and a harness, wherein the harness connects the camera stabilizer to the torso of a human via the harness.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to a camera stabilizer. The camera stabilizer is an ergonomically designed camera support and stabilization device which mechanically distributes the weight and tension felt by the hand holding the camera to the forearm and upper arm of the camera operator so as to reduce, or eliminate, the fatigue and shakiness often experienced during operation of the camera. The camera stabilizer is also designed to liberate a camera operator by enabling the use of positions and angles for image capture that the camera operator would not otherwise be able to use due to arm fatigue and the undesired shaky motion caused thereby.

In addition to the camera stabilizer's use as a stabilization brace between the hand and forearm, the stabilizer's design and functionality further enables new angles and positions for the camera user that would not be available but for the camera stabilizer. For example, when not used as a brace, the camera stabilizer can selectively be used as a monopod to provide a stabilizing platform for the camera. In addition, the position of the camera and stabilizer can be fixed in place so as to use the camera as an extension of the operator's arm so as to place the camera in angles, positions and locations for the camera operator that would not otherwise be available without the camera stabilizer.

The present invention is also directed to a camera stabilization kit that includes such camera stabilizer and a harness, or sling. The harness can include a looped restraint that tethers the camera stabilizer to the camera operator's torso and supports the camera stabilizer in a bodily supported position so as to further reduce fatigue and unwanted movement as a result of prolonged use felt by smaller bodily muscles of the arms.

The harness can include a pouch within which a proximate portion of the camera stabilizer is held so as to provide a torso supported stability point from which the weight of the camera and camera stabilizer is supported. As such, this stability point can be a pivot point to which the camera stabilizer can act as a weight supported monopod for further stabilizing the camera. The harness can also include a strap that connects to a distal end of the camera stabilizer for providing further stabilization of the camera and further reducing fatigue and stress felt by the camera operator. When used in conjunction with a harness included with the kit, the camera stabilizer can further liberate the camera operator by at least partially providing the support structure for the camera thereby allowing a hand of the operator to be used for camera control adjustment rather than being used for camera support.

Figure 1:
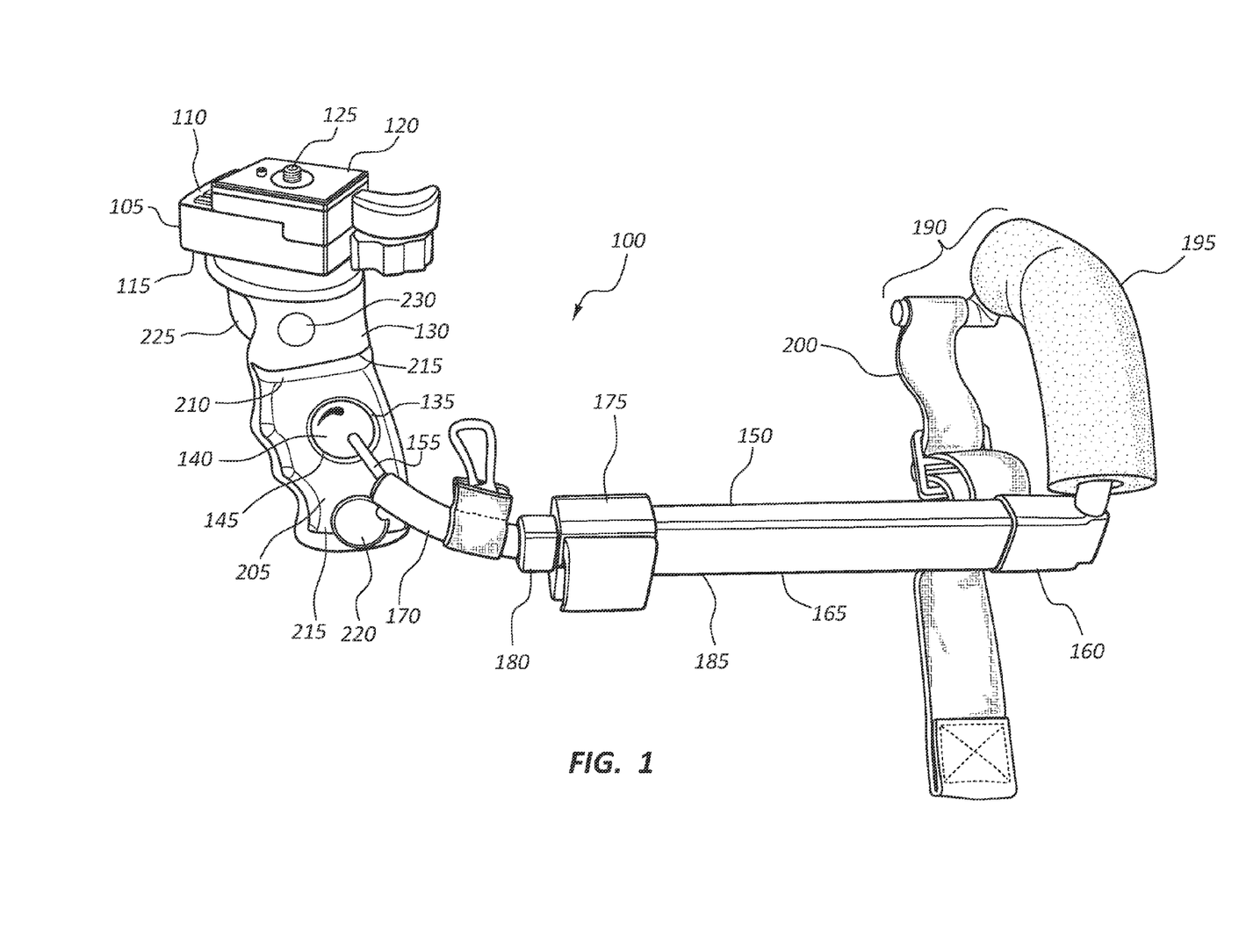
FIG. 1 illustrates a camera stabilizer for stabilizing a motion picture or still camera while recording motion pictures or still photos in a retracted position.

Referring to FIG. 1, a camera stabilizer 100 is shown for stabilizing a motion picture camera or still camera while recording motion images or still photos. The camera stabilizer 100 includes a camera mount 105 having a first side 110 and a second side 115. The first side 110 of the camera mount 105 including means for attaching the camera mount to a camera. The means for attaching the camera mount to a camera includes a detachable mounting plate 120 with a bolt, or thumbscrew, 125 to hold onto the camera. The standard threading for the bolt 125 that attaches the camera to the camera stabilizer 100 is ¼"-20 tpi (threads per inch) British Standard Whitworth (Whitworth or BSW) for smaller cameras or ⅜"-16 tpi BSW for larger cameras and pan/tilt heads.

The camera stabilizer 100 further includes a grip 130 connected to the second side 115 of the camera mount 105. The grip 130 is sized and shaped to be held in the palm of a human hand. The camera mount 105 allows connection to a camera or camcorder (not shown) to the grip 130 and thus to the camera stabilizer 100.

Figure 2:
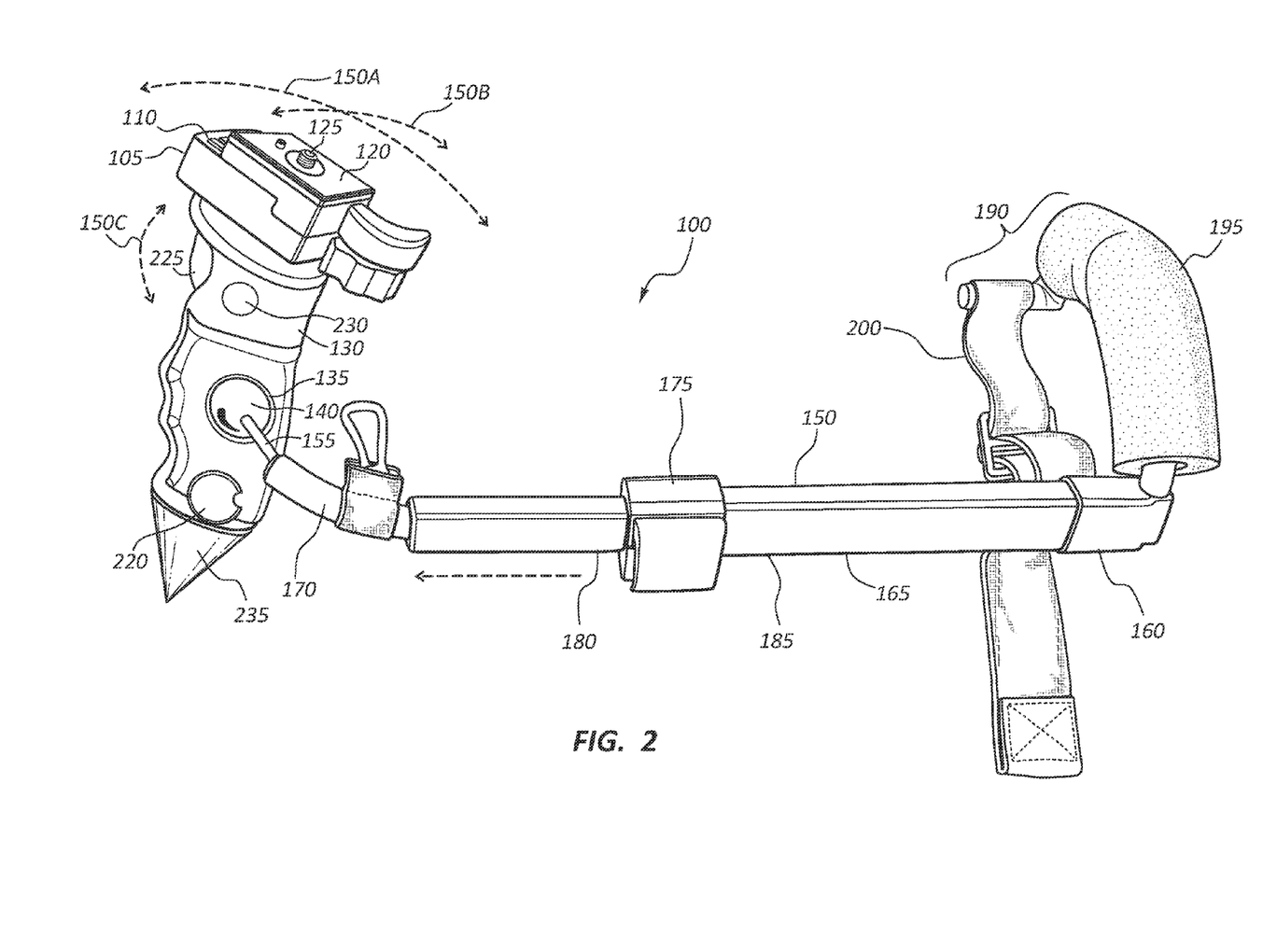
FIG. 2 illustrates the camera stabilizer for stabilizing a motion picture or still camera while recording motion pictures or still photos in an extended position.

In FIGS. 1 and 2, the camera mount 105 is shown with the mounting plate 120 that is lockingly removable from the camera mount 120. The mounting plate 120 may be attached to the bottom of a camera (not shown), and then the locking plate 120 attached to the camera engages the camera mount 105. This allows the camera to be lockingly and reversibly mounted to the camera stabilizer. This mounting plate 120 can be the same type of locking plate as is common with tripods and other camera mounts known in the art or can be a different locking plat then commonly used.

The camera stabilizer further includes a joint 135 coupled to the grip 130. The joint 135 can have at least two degrees of rotational freedom. Preferably the joint 135 includes a ball joint including a bearing stud 140 and socket 145 as shown in FIGS. 1 and 2 with three degrees of rotational freedom including tilting forward and backward 150A, tiling left and right 150B, and tilting side-to-side 150C.

As shown in FIGS. 1 and 2, the socket is disposed within the grip in between the first and second ends of the grip such that the socket is held in substantially the center of the palm of a human hand when in-use.

The camera stabilizer further includes an arm piece 150 connected with the joint 135. The arm piece 150 extends substantially the length of the human forearm. The arm piece 150 includes a distal end 155 connected to the joint 135 so as to be pivotally coupled to the grip 130. The arm piece 150 also includes a proximal end 160. The arm piece 150 includes a substantially straight section 165 which extends along a length of a human forearm when in use and a curved section 170 which extends at one end of the arm piece 150 so as to connect with the joint 135 pivotally coupled to the grip 130.

The substantially straight section 165 of the arm piece is fixedly adjustable in length such that the distance between the distal end 155 and the proximal end 160 of the arm piece 150 is adjustable as can be understood by a comparison of the arm piece 150 in FIG. 1 in its retracted position and arm piece 150 in its extended position. For example, the arm piece 150 can include a releasable lock 175, or clip, which retains the arm piece 150 in the extended position of FIG. 2, in the retracted position of FIG. 1, or in any position there between by releasing the lock 175, manually adjusting the length of the arm piece 150 by sliding a first relatively small diameter portion 180 into and out of a second relatively large diameter portion 185 and engaging the lock 175 at the desired position so as to fix the desired length of the arm piece 150 associated with the length of the arm of the camera operator. The lock 175 can also be partially engaged so as to frictionally impair movement of the distal end relative to the proximal end but not fully prevent movement along its length.

While the camera stabilizer 100 shown in FIGS. 1 and 2 is designed for a camera operator who generally holds the camera in the right hand, one of ordinary skill will understand in view of this disclosure that a similarly configured left-handed version is also envisioned herein. A left handed camera stabilizer is almost identical to that shown in FIGS. 1 and 2 except that the arm piece attaches to the joint on the right side of the grip such that the curved portion of the arm piece extends out and away from the palm of the left human hand and curves back along the forearm and toward the elbow as shown in FIGS. 1 and 2 for a right-handed camera stabilizer 100.

The camera stabilizer 100 further includes a forearm brace 190 located at the proximal end 160 of the arm piece 150. The forearm brace 190 is configured to at least partially encircle a human forearm proximate to the human's elbow. As shown in FIGS. 1 and 2 the forearm brace 190 includes a substantially ridged and curved section 195 connected to the proximal end 160 of the arm piece. The forearm brace 190 further includes an adjustable strap 200 configured to hold the forearm securely against the ridged and curved section 195 of the arm band when in use. And the curved section may be fitted with foam padding as shown, or shaped so as to distribute torsional force over the operator's forearm. Thus, the forearm brace 190 is configured to securely encircle the human forearm when in use such that the forearm brace 190 counteracts torsional forces to the forearm brace 190 in any direction in response to manipulating the grip 130 in any number of different directions.

The joint 140 includes means for increasing and decreasing mobility of the joint. For example, the joint 140 can include a variable friction clutch for increasing and decreasing the level of mobility of the joint. For example, as shown in FIGS. 1 and 2 the variable friction clutch can include a locking plate 205 that forms at least part of the socket 145 within which the ball stud 140 is received and rotates. The locking plate 205 can include a first end 210 that is received within a slot 215 in the handle 130 so as to pivotally fix the locking plate 205 at one end such that the locking plate 215 only has one degree of rotation about the pivot point formed by the slot 215 and first plate end 210 engagement. The second end 215 of the locking plate 205 can have a hole (not shown) through which a tensioner 220 extends. The tensioner 220 can be in the form of a screw, or dial, that screws into and out of the handle 130 so as to increase and decrease bias against the second end 215 of the locking plate 205 thereby increasing and decreasing pressure placed on the ball stud 140 by the locking plate 205. As a result, friction between the locking plate 215 and the ball stud 140 is increased and decreased thereby increasing and decreasing mobility of the joint 135.

The camera stabilizer 100 can also include means for locking the joint in a fixed position. For example, the joint can include a trigger 225, lever, clip or other locking feature for securing the position of the joint 135 so as to retain the location of the grip 130 and camera with respect to the position of the arm piece 150 in a locked relative position so as to maneuver the camera stabilizer 100 without changing its relative positional configuration. For example, the grip 130 can move by depressing trigger 225 which unlocks the ball joint 135. By releasing the trigger 225, or other locking device, the grip 130 locks into the position in relation to the arm piece 150 needed by the operator.

Squeezing the trigger 225 can also activate an internal spring (not shown) that releases a locking force on the joint 135, allowing the joint 135 to move freely or to move with a frictional impairment, as desired. The amount of friction remaining on movement of the ball joint upon activation of the trigger 225 may be controlled by a friction control device incorporated into the grip 130. When the ball joint 135 and grip 130 are in the desired position, the trigger 225 is released, re-locking the ball joint 135 in the newly-assumed position. With this type of locking mechanism, the adjustment of the camera stabilizer 100 may be achieved in one-handed fashion by the hand holding the camera stabilizer 100, even in the middle of shot.

The trigger 225 may be omitted as well where the tensioner 220 is used to substantially lock the joint 135 in place by creating enough pressure on the locking plate 205 so as to effectively increase the static friction between the locking plate 205 and the ball stud 140 such that the ball stud 140 is prevented from moving within the socket 145.

The grip may also be modified to include a set of controls 230 to control the camera mounted to the camera mount 105. Such a set of grip 130 mounted controls 230 allows the user to control those aspects of the camera or camcorder normally accessed by the hand gripping the camera without a camera stabilizer 100. For example, to start and stop recording, take a photo, and zoom in and out an operator can manipulate the controls 230 using a thumb or some other finger holding the handle 130.

Also, while a ball joint has been depicted to provide the greatest degree of movement of the grip relative to the arm piece 150, it is understood in view of these teachings that other mechanisms may be provided to replace the ball joint 135, and that the ball joint 135 can be replaced with a fluid head connection, if desirable. Other types of joints can be used, such as a gimbal head, a gear head, an alt-azimuth, and an equatorial head. Fluid joints and gear joints move smoothly, avoiding the jerkiness caused by the stick-slip effect found in other types of joints. Other types of manufactured joints can also be incorporated such as ball head camera mount joints which include a tensioner screw with a cone on the end which biases against a ball joint to prevent movement thereby. Such manufactured joints can also be used in place of the ball joint configuration of FIGS. 1 and 2. However, as disclosed herein ball joint 135 allows for three degrees of rotational freedom and is relatively easily manufactured.

When not in use, the camera stabilizer 100 is able to fold at the ball joint 135 so as to provide a compact and streamlined form for storage. To further provide for compactness of storage, a portion of the arm piece 150 may be bent to allow more complete collapsing at the ball joint 135. Alternatively, the camera stabilizer 100 may be separable into components, so that the grip 130 and ball joint 135 may be removed from the arm piece 150 and forearm brace 190 for storage. This allows the use of the components of the camera stabilizer 100 with other equipment, or allows switching out of camera stabilizer 100 components, such as to change the size of the arm piece 150 or forearm brace 190 for different situations and users. As one example, in some instances the user might remove the ball joint 135 and grip 130 and attach the ball joint 135 and grip 130 to a tripod for a tripod-mounted shot.

As shown in FIG. 2, the camera stabilizer 100 can include a gyroscope 235 disposed 100 for helping further reduce shakiness and unwanted abrupt changes of orientation of the camera. For example, the gyroscope 235 can be disposed on the bottom side of the grip 130. A gyroscope is a device for measuring or maintaining orientation, based on the principles of conservation of angular momentum.

A mechanical gyroscope, for example, is essentially a spinning wheel or disk whose axle is free to take any orientation. This orientation changes much less in response to a given external torque than it would without the large angular momentum associated with the gyroscope's high rate of spin. Since external torque is minimized by mounting the device in gimbals, its orientation remains nearly fixed, regardless of any motion of the platform on which it is mounted. Within mechanical systems or devices, a conventional gyroscope is a mechanism comprising a rotor journalled to spin about one axis, the journals of the rotor being mounted in an inner gimbal or ring, the inner gimbal is journalled for oscillation in an outer gimbal which is journalled in another gimbal for a total of three gimbals.

The outer gimbal or ring which is the gyroscope frame is mounted so as to pivot about an axis in its own plane determined by the support. This outer gimbal possesses one degree of rotational freedom and its axis possesses none. The next inner gimbal is mounted in the gyroscope frame (outer gimbal) so as to pivot about an axis in its own plane that is always perpendicular to the pivotal axis of the gyroscope frame (outer gimbal). This inner gimbal has two degrees of rotational freedom. Similarly, next innermost gimbal is attached to the inner gimbal which has three degrees of rotational freedom and its axis possesses two.

Figure 3:
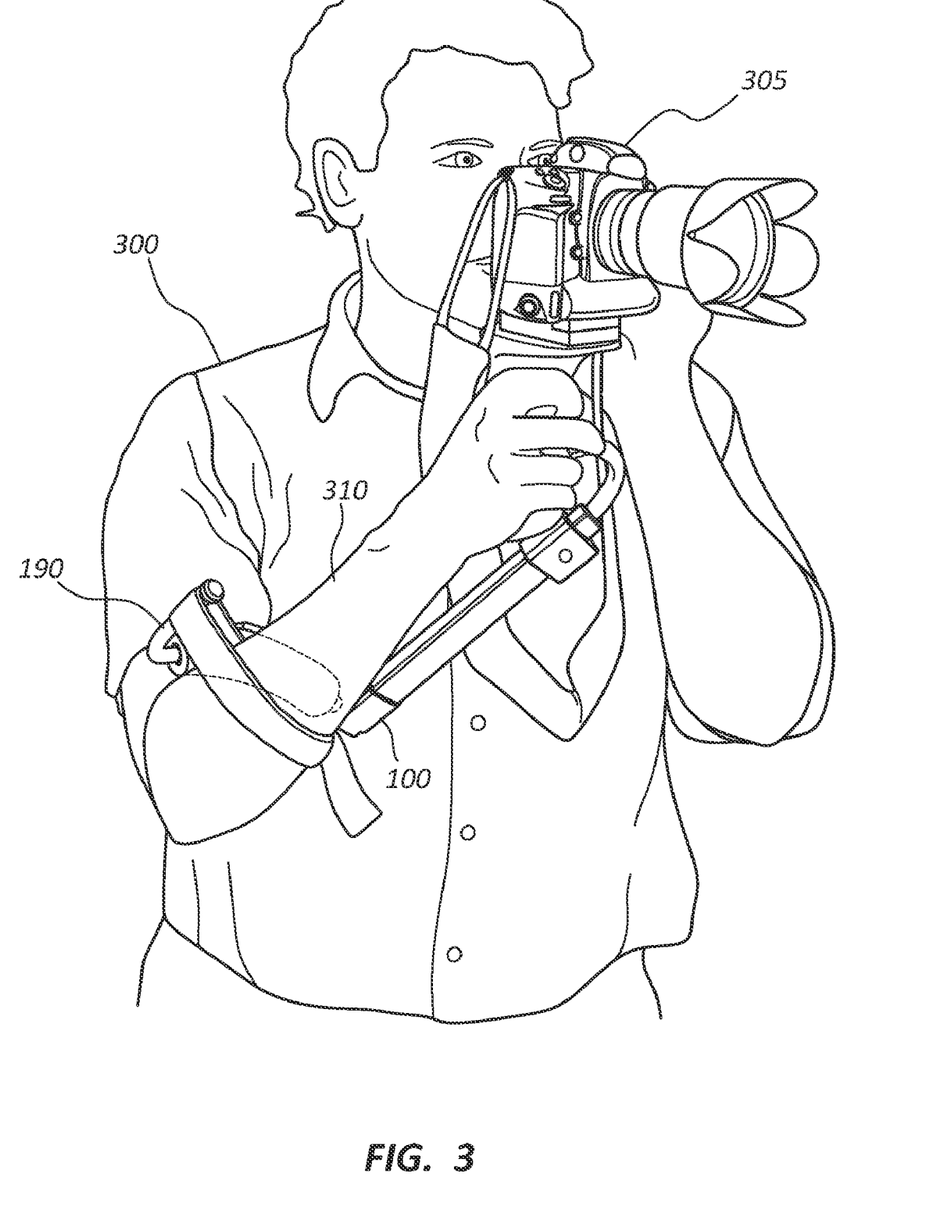
FIG. 3 illustrates a first position of which the camera stabilizer may be used where a camera operator is holding the camera stabilizer in his right hand with a camera attached thereto.

FIG. 3 illustrates a first position of which the camera stabilizer 100 may be used where the camera operator 300 is holding the camera stabilizer 100 in his right hand with a camera 305 attached thereto. The forearm brace 190 of the camera stabilizer 100 is secured to the operator's forearm 310 and the camera operator 300 holds the camera 305 near his face to look through the camera viewfinder or to view what is displayed on an LCD screen of the camera 305.

Figure 4:
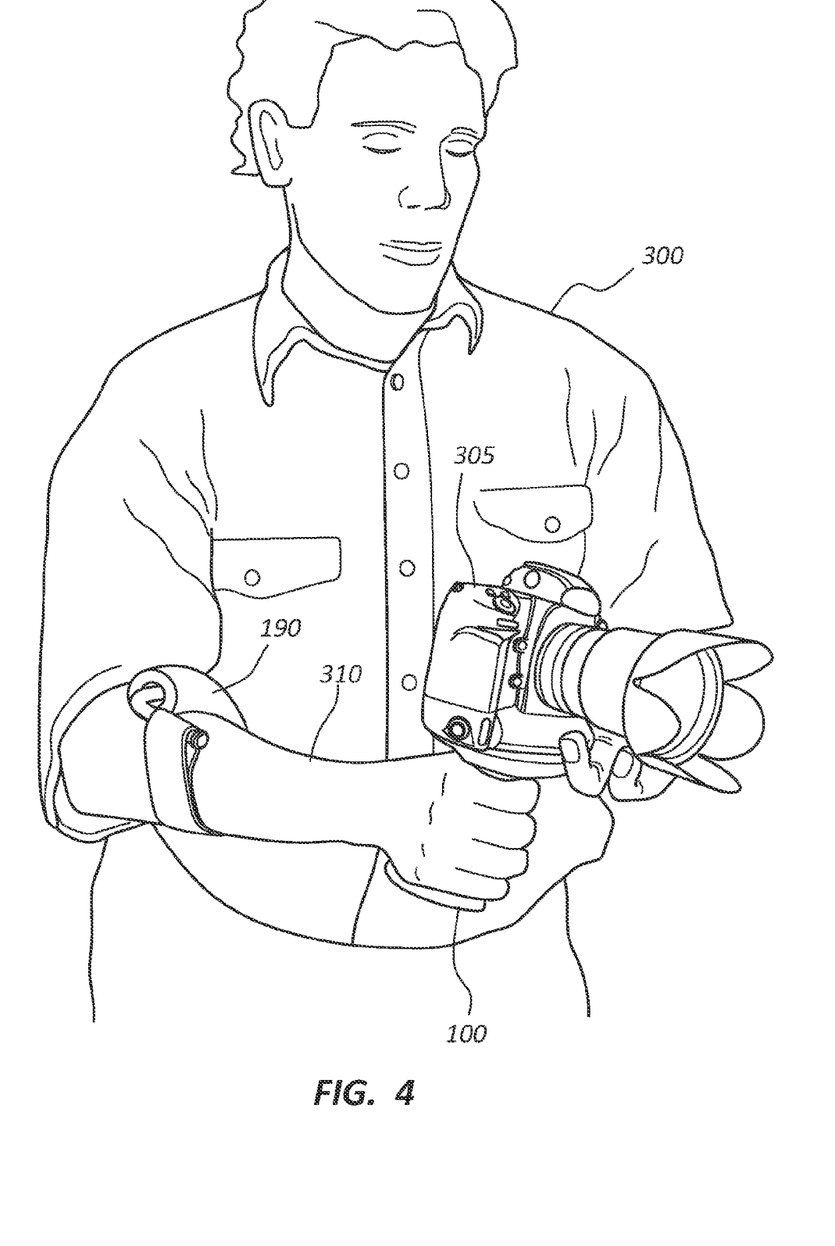
FIG. 4 illustrates a position of which camera stabilizer and the camera are held at the camera operator's waist and the camera operator watches a screen display that is disposed on the rear of the camera.

Referring to FIG. 4 is another position of which camera stabilizer 100 may be used. In this position the camera 305 is held at the camera operator's 300 waist and the camera operator 300 watches a screen display that is disposed on the rear of the camera 305. In this position the images may be captured from a lower angle and different physical position than in the FIG. 3.

The position depicted in FIG. 4 can be particularly advantageous where the camera operator is standing and can walk while recording someone at eye level who is sitting. Or, for example, for recording children at eye level while the camera man is moving. The position shown in FIG. 4 would not be possible using a shoulder supported camera as the camera operator would be required to crouch down and experience increased fatigue by such limitations.

Figure 5:
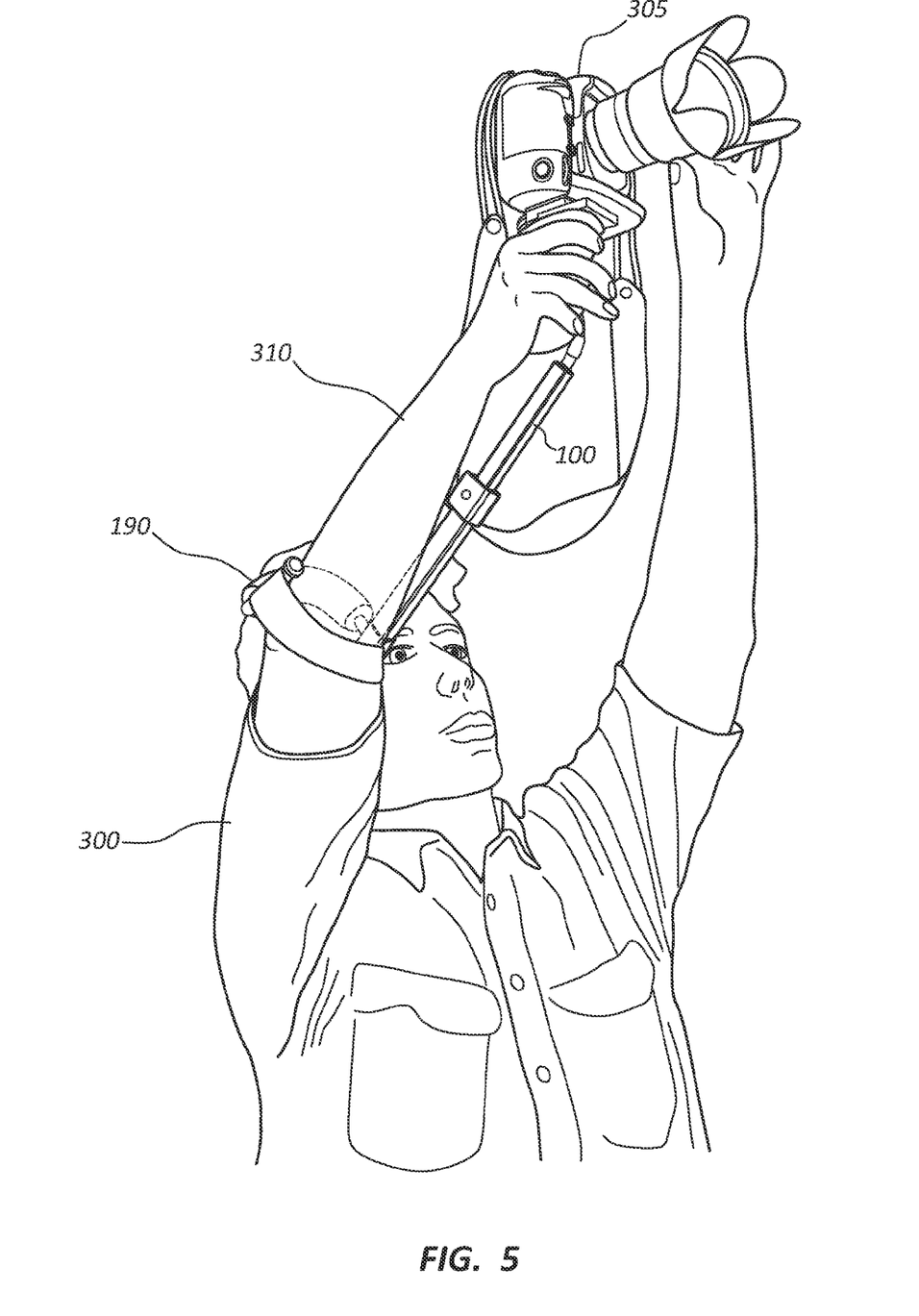
FIG. 5 illustrates a position where the camera stabilizer is being used to place the camera at a position above the head of the camera operator.

Referring to FIG. 5, the camera stabilizer 100 is being used to place the camera 305 at a position above the head of the camera operator 300 where the camera operator 300 can view what is being recorded from the LCD display on the back of the camera 305.

Similarly, using the camera stabilizer along with the camcorder flip-out view screen, the videographer may make shots backward over his or her opposite shoulder, or to the side. These shot angles are facilitated by the extreme flexibility of the ball joint. Without the camera stabilizer, such shots are limited to the amount the user's hand will turn, or require removing the user's hand from the camcorder strap and fumbling with turning the camera around. This fumbling may lead to unwanted interruption of the shot, or unwanted shaking during the turning maneuver. In this way, the camera operator may make continuous fairly-steady shots to the side or back while walking and may even be discreet while doing so.

As can be appreciated by a review of FIGS. 3-5 the camera stabilizer 100 allows use of the smaller camera 305 of today in a multitude of different positions and angles than that which would be available using a shoulder mounted camera of the past. And, with the camera stabilizer 100 reduced shake and jitter is also achieved using the smaller camera of today.

Figure 6:
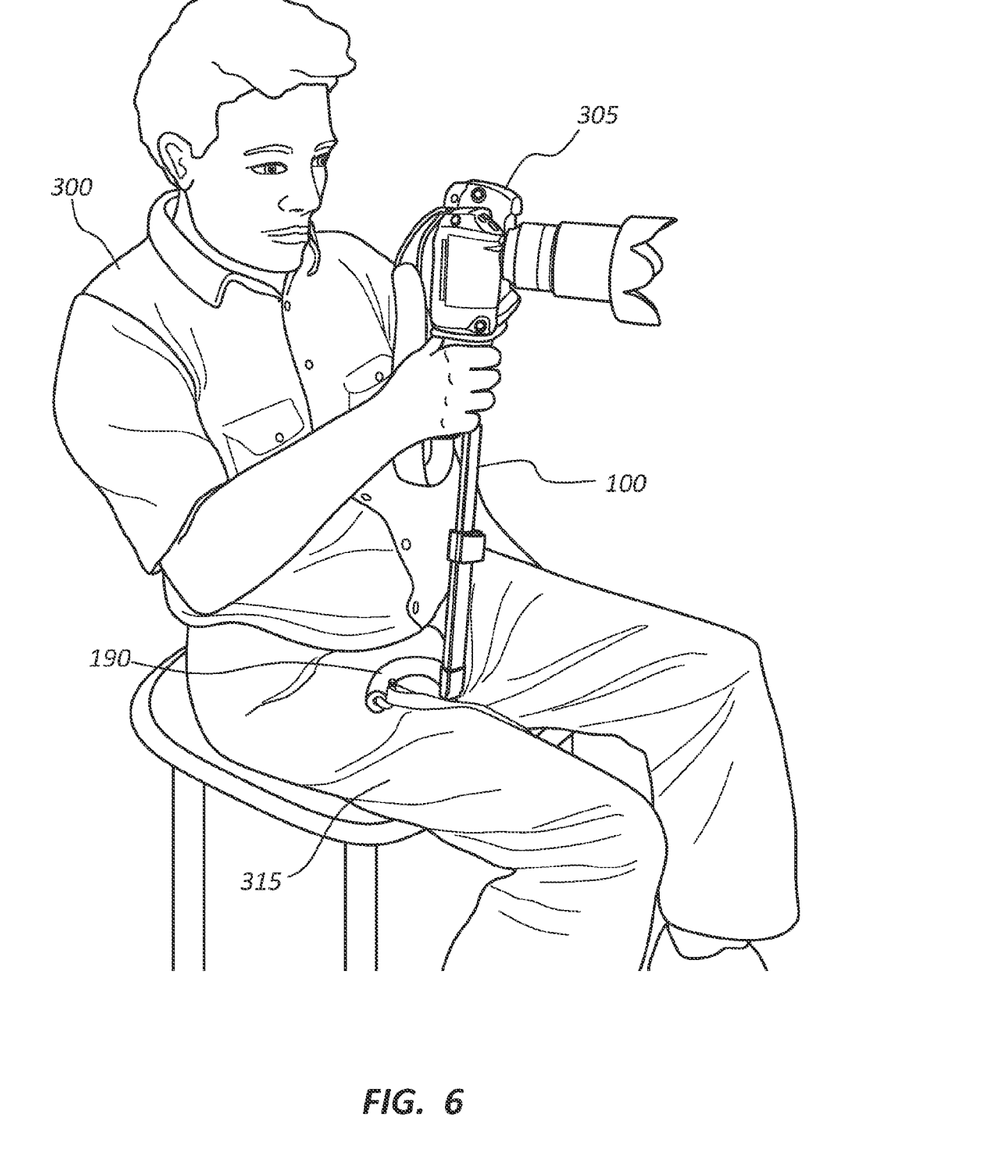
FIGS. 6 and 7 illustrate how the camera operator can use the camera stabilizer as a monopod using the camera operator's leg or a table for support.
Figure 7:
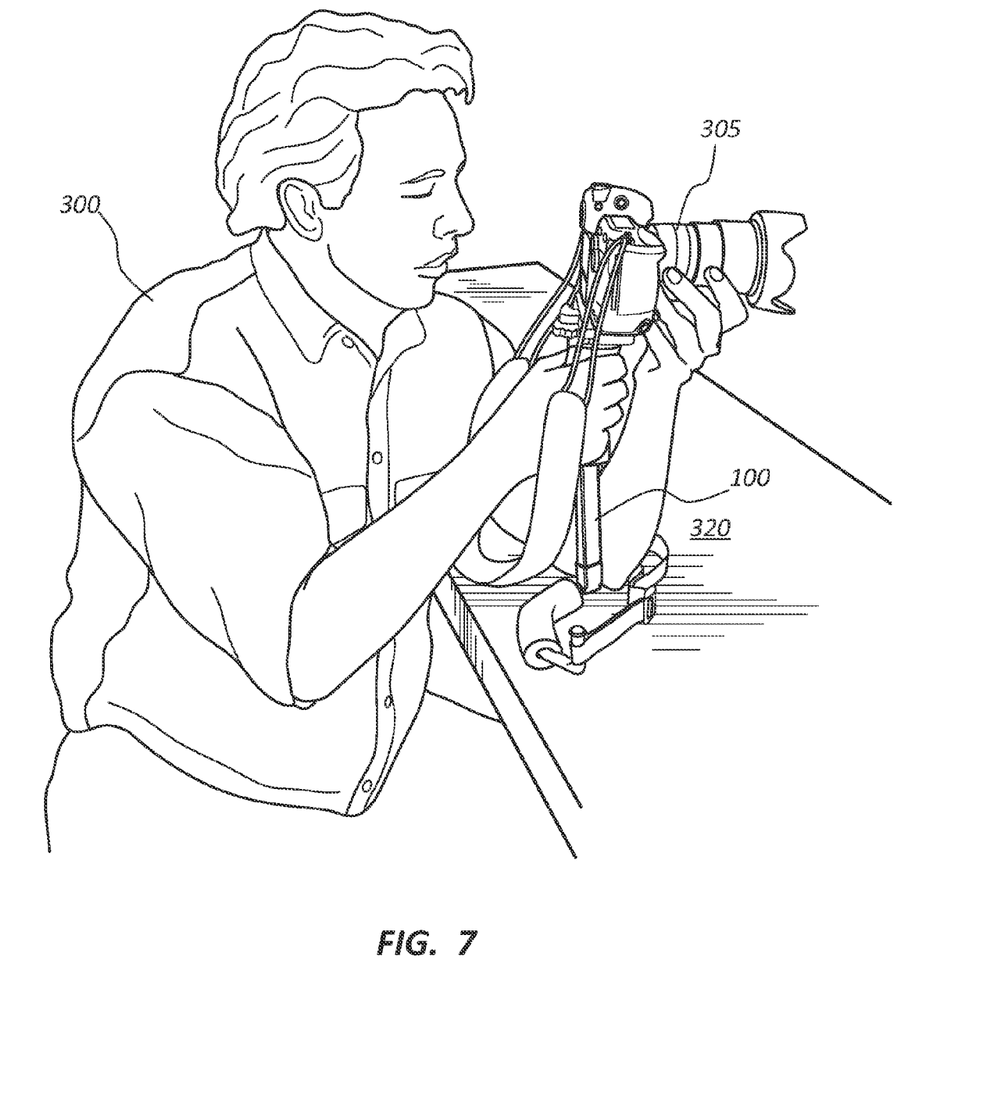

In addition to its use as a camera stabilizer as shown in FIGS. 3-5 the camera stabilizer 100 can also act as a monopod thereby offering additional stability use when not secured to the arm of the camera operator 300. For example, FIGS. 6 and 7 illustrate how the camera operator 300 can use the camera stabilizer 100 as a monopod using the camera operator's 300 leg 315 or a table 320 for support. The stabilizer arm can also be adjusted as shown by a comparison of FIGS. 6 and 7 so as to place the camera at the desired height depending on the level of the support.

Figure 8:
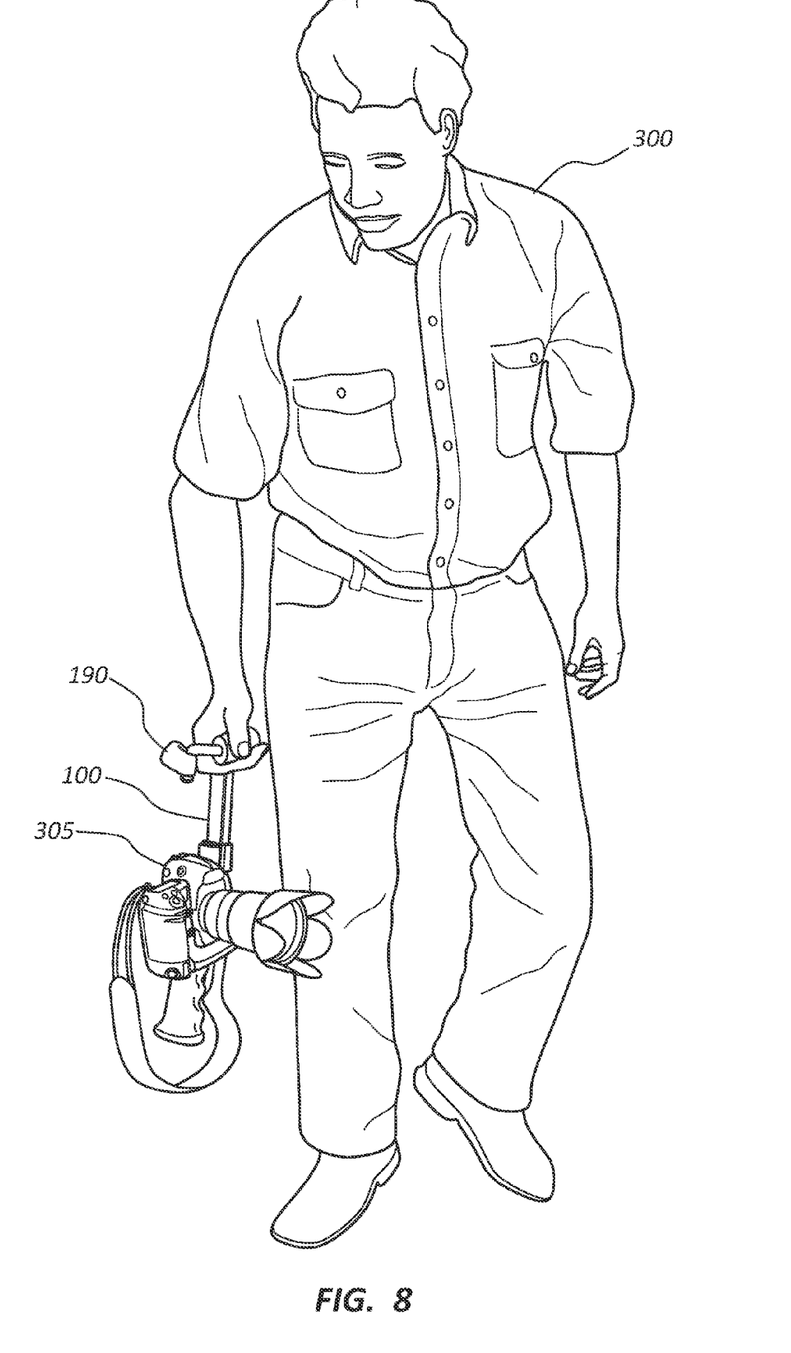
FIG. 8 shows the camera stabilizer being used as an extension of the camera operator's arm by the camera operator holding the forearm brace and extending the camera toward the ground.

The camera stabilizer 100 can also be used as an extension to the camera operator's 300 arm so as to allow camera positions and angles that would not otherwise be available but-for the camera stabilizer 100. For example, FIG. 8 shows the camera stabilizer 100 being used as an extension of the camera operator's 100 arm by the camera operator holding the forearm brace 190 and extending the camera 305 toward the ground thereby enabling additional positions and angles not otherwise available without the camera stabilizer 100 and further emphasizing the maneuverability of the cameras of today. Similarly the camera stabilizer 100 can be used to extend the camera 305 further above the head of the camera operator thereby enabling the camera operator to capture picture and video over crowds, for example.

Figure 9:
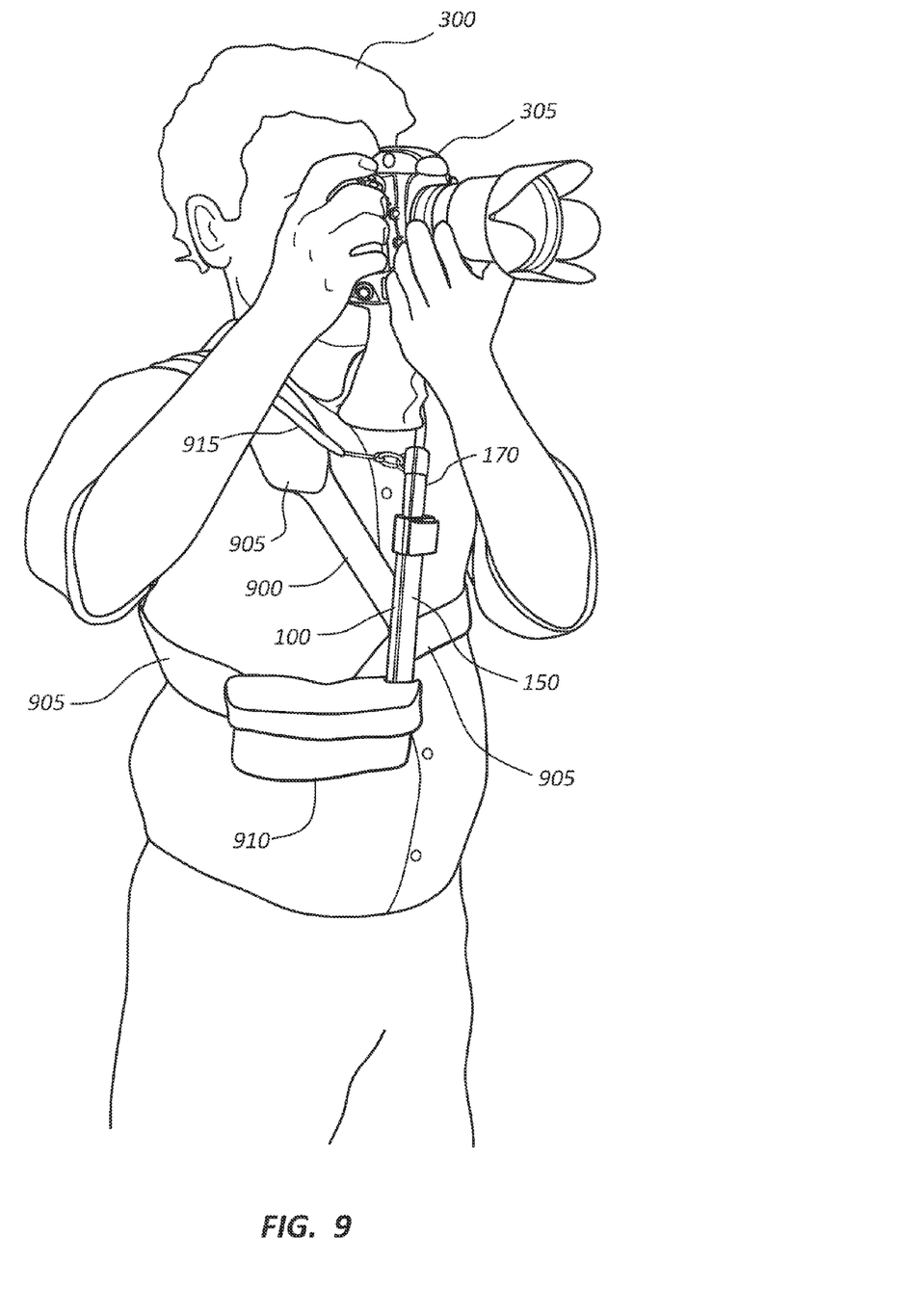
FIG. 9 illustrates a kit that includes the camera stabilizer and a harness.

Referring to FIG. 9, a kit is illustrated that includes the camera stabilizer 100 and a harness 900. The harness 100 connects the camera stabilizer 100 to the torso of a camera operator 300 via the harness. The harness 900 includes a plurality of straps 905 that encircle the torso of the camera operator 300 and physically couple the torso of the camera operator 300 with the camera 305 via the camera stabilizer 100.

The harness can include a holder 910 that holds the forearm brace of the camera stabilizer 100 near the waist of the camera operator 300. The harness 900 can also include an adjustable elastic strap 915 that connects to the distal end 170 of the arm piece 150 to a strap 905 of the harness 900 near the shoulder or neck of the camera operator 300 wearing the harness. Therefore, the harness 300 provides a further option to support the camera 305 using the camera operator's 300 torso more closely akin to the shoulder supported cameras of the past if the camera operator 300 so desires.

The position depicted in FIG. 9 can also be lowered similar to FIG. 4 with adjustment to the length of the elastic strap, if needed, such that the camera is held in a lower position toward the waist. As discussed above, this position can be particularly advantageous where the camera operator is standing and can walk while recording someone at eye level who is sitting. Or, for example, for recording children at eye level while the camera man is moving. The position shown in FIG. 4 would not be possible using a shoulder supported camera as the camera operator would be required to crouch down and experience increased fatigue by such limitations.

Figure 10A:
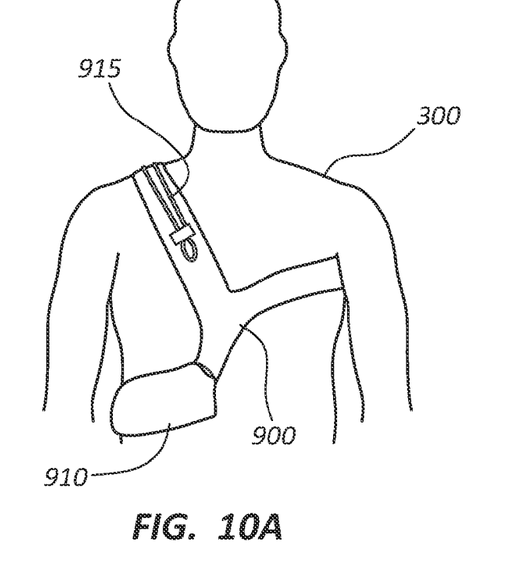
FIGS. 10A and 10B illustrate front and back depictions of the harness respectively on a camera operator without the camera stabilizer.
Figure 10B:
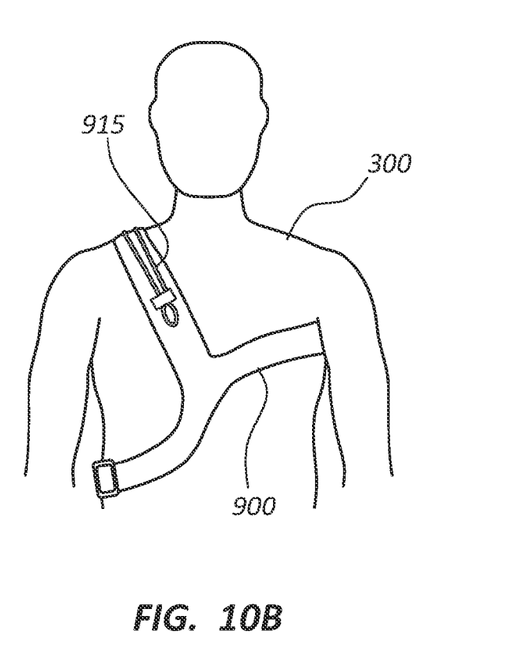

FIGS. 10A and 10B illustrate front and back depictions of the harness respectively on a camera operator 300 without the camera stabilizer 100 so that one of ordinary skill in the art might understand one way that the harness may be configured to be tethered to the torso of the camera operator 300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A camera stabilizer for stabilizing a motion picture camera or still camera while recording motion pictures or still photos, comprising:
    a camera mount having a first side and a second side, the first side including means for attaching the camera mount to the camera;
    a grip connected to the second side of the camera mount, the grip being sized and shaped to be held in the palm of a human hand;
    a joint attached to the grip;
    an arm piece connected with the joint, the arm piece extending substantially the length of the human forearm, the arm piece comprising:
        a distal end connected to the joint so as to be pivotally connected to the grip; and
        a proximal end; and
    a forearm brace located at the proximal end of the arm piece, the forearm brace configured to at least partially encircle a human forearm proximate to the human's elbow.

2. A camera stabilizer according to claim 1, wherein the joint includes at least two degrees of rotational freedom.

3. A camera stabilizer according to claim 1, wherein the joint includes three degrees of rotational freedom including tilting forward and backward, tilting left and right, and tilting side-to-side.

4. A camera stabilizer according to claim 1, wherein the joint includes a ball joint including a bearing stud and socket, a metal ball portion of the bearing stud being received by the socket.

5. A camera stabilizer according to claim 4, the grip having a first end to which the camera mount is connected and a second end, wherein the socket is disposed within the grip between the first and second ends of the grip such that the socket is held in substantially the center of the palm of a human hand when in use.

6. A camera stabilizer according to claim 1, wherein the arm piece includes a substantially straight section which extends along a length of a human forearm when in-use and a curved portion which extends at one end of the arm piece so as to connect with the joint attached to the grip.

7. A camera stabilizer according to claim 1, wherein the substantially straight section of the arm piece is fixedly adjustable in length such that the distance between the distal end and the proximal end of the arm piece is adjustable.

8. A camera stabilizer according to claim 6, wherein the arm piece attaches to the joint on either the left or right side of the grip such that the curved portion of the arm piece extends out and away from the palm of a human hand and curves back along the forearm and toward the elbow when in use.

9. A camera stabilizer according to claim 1, wherein the forearm brace is configured to fully encircle the human forearm when in use.

10. A camera stabilizer according to claim 9, wherein the forearm brace includes a substantially ridged and curved section connected to the proximal end of the arm piece.

11. A camera stabilizer according to claim 10, wherein the forearm brace includes an adjustable strap configured to hold the forearm securely against the ridged and curved section of the forearm brace when in-use.

12. A camera stabilizer according to claim 1, wherein the joint includes means for selectively increasing and decreasing mobility of the joint.

13. A camera stabilizer according to claim 1, wherein the joint includes a variable friction clutch for increasing and decreasing the level of mobility of the joint.

14. A camera stabilizer according to claim 1, wherein the camera stabilizer includes means for locking the joint in a fixed position.

15. A camera stabilizer according to claim 1, wherein the grip includes an electronic control for electronically communicating with the camera mounted on the camera mount via the electronic control.

16. A camera stabilizer according to claim 1, further comprising a gyroscope attached to the grip of the camera stabilizer, wherein the gyroscope assists in maintaining the orientation of the camera.

17. A kit comprising:
    the camera stabilizer of according to claim 1; and
    a harness, wherein the harness connects the camera stabilizer to the torso of a human via the harness.

18. A kit according to claim 17, wherein the harness includes a plurality of straps that encircle the torso of the human and physically couple the torso of the human with the camera stabilizer and camera.

19. A kit according to claim 17, wherein the harness includes a holder that holds the forearm brace of the camera stabilizer near the waist of the human.

20. A kit according to claim 17, wherein the harness includes an elastic strap that connects to the distal end of the arm piece and to a portion of the harness near the shoulder or neck of the human wearing the harness.

* * * * *